(12) United States Patent
Ha

(10) Patent No.: US 11,436,698 B2
(45) Date of Patent: Sep. 6, 2022

(54) METHOD OF PLAYING BACK IMAGE ON DISPLAY DEVICE AND DISPLAY DEVICE

(71) Applicant: Samsung Electronics Co., Ltd., Suwon-si (KR)

(72) Inventor: Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/021,196

(22) Filed: Sep. 15, 2020

(65) Prior Publication Data
US 2021/0233207 A1 Jul. 29, 2021

(30) Foreign Application Priority Data

Jan. 28, 2020 (KR) .................... 10-2020-0009927

(51) Int. Cl.
*G06T 17/00* (2006.01)
*G06T 3/00* (2006.01)
*H04N 13/366* (2018.01)

(52) U.S. Cl.
CPC ............ *G06T 3/0093* (2013.01); *G06T 3/005* (2013.01); *H04N 13/366* (2018.05)

(58) Field of Classification Search
None
See application file for complete search history.

(56) References Cited

U.S. PATENT DOCUMENTS

| 6,249,289 | B1* | 6/2001 | Arnaud | G06T 15/005 345/582 |
| 8,467,627 | B2* | 6/2013 | Gwak | G06K 9/00281 382/275 |
| 10,082,865 | B1* | 9/2018 | Raynal | G02B 27/0093 |
| 2003/0030597 | A1 | 2/2003 | Geist | |
| 2004/0156558 | A1* | 8/2004 | Kim | G06T 3/0081 382/276 |
| 2012/0296396 | A1* | 11/2012 | Moffitt | G16H 40/40 607/59 |

(Continued)

FOREIGN PATENT DOCUMENTS

KR   10-1617842 B1   5/2016
KR   10-2018-0123354 A   11/2018

(Continued)

OTHER PUBLICATIONS

Blaicher, Automatic Distortion Correction for a Full Windshield Head-up Display System, 2009, Carnegie Mellon University (Year: 2009).*

*Primary Examiner* — Anh-Tuan V Nguyen
(74) *Attorney, Agent, or Firm* — NSIP Law

(57) ABSTRACT

A method of playing back an image in a display device obtains a stereo image corresponding to both eyes of a user including a left eye and a right eye, obtains positions of the eyes determines warping transform information corresponding to the positions of the eyes based on a database (DB) provided in advance based on a curvature of an display plane of the display device, warps the stereo image by applying the warping transform information to the stereo image, determines pixel values of a display panel included in the display device from the warped stereo image by performing light field rendering based on the positions of the eyes, and reproduces the determined pixel values on the display panel.

22 Claims, 9 Drawing Sheets

(56) References Cited

U.S. PATENT DOCUMENTS

| | | | |
|---|---|---|---|
| 2013/0242054 A1* | 9/2013 | Chiu | G06T 17/20 |
| | | | 348/46 |
| 2014/0035959 A1* | 2/2014 | Lapstun | H04N 5/23212 |
| | | | 345/690 |
| 2016/0091720 A1* | 3/2016 | Stafford | G02B 27/0093 |
| | | | 345/8 |
| 2016/0357015 A1* | 12/2016 | Yagi | G02B 27/0101 |
| 2017/0168561 A1* | 6/2017 | Yang | G02B 27/01 |
| 2017/0169612 A1* | 6/2017 | Cashen | G06T 7/50 |
| 2017/0178288 A1* | 6/2017 | Adaszewski | G06T 19/006 |
| 2017/0193687 A1* | 7/2017 | Lo | G06T 19/006 |
| 2017/0272668 A1* | 9/2017 | Ribardo, Jr. | G06T 3/00 |
| 2017/0329136 A1* | 11/2017 | Bates | G02B 27/0093 |
| 2018/0033155 A1* | 2/2018 | Jia | H04N 5/23235 |
| 2018/0053284 A1 | 2/2018 | Rodriquez et al. | |
| 2018/0108110 A1* | 4/2018 | Cuervo | G02B 27/017 |
| 2018/0158172 A1* | 6/2018 | Trageser | G02B 27/0093 |
| 2018/0262687 A1* | 9/2018 | Hildreth | H04N 13/344 |
| 2018/0268564 A1* | 9/2018 | Sumikawa | B60K 35/00 |
| 2018/0350032 A1 | 12/2018 | Bastani et al. | |
| 2019/0086679 A1 | 3/2019 | Ratcliff et al. | |
| 2019/0226830 A1 | 7/2019 | Edwin et al. | |
| 2019/0317599 A1 | 10/2019 | Akenine-Moller et al. | |
| 2019/0347763 A1 | 11/2019 | Goel et al. | |
| 2020/0143585 A1* | 5/2020 | Seiler | G06T 19/006 |
| 2020/0228791 A1* | 7/2020 | Kusafuka | H04N 13/39 |
| 2021/0132693 A1* | 5/2021 | Pulli | G02B 30/31 |
| 2021/0201853 A1* | 7/2021 | Manfred | G02B 27/0093 |

FOREIGN PATENT DOCUMENTS

| | | |
|---|---|---|
| WO | WO 2019/217260 A1 | 11/2019 |
| WO | WO 2019/217262 A1 | 11/2019 |

* cited by examiner

METHOD OF PLAYING BACK IMAGE ON DISPLAY DEVICE AND DISPLAY DEVICE

CROSS-REFERENCE TO RELATED APPLICATIONS

This application claims the benefit under 35 USC § 119(a) of Korean Patent Application No. 10-2020-0009927, filed on Jan. 28, 2020, in the Korean Intellectual Property Office, the entire disclosure of which is incorporated herein by reference for all purposes.

BACKGROUND

Field

The following description relates to a method of playing back an image on a display device and the display device.

Description of Related Art

Warping in an imaging system refers to a method for correcting an image using, for example, movement (an x-axis or a y-axis), rotation, and scale of the image. However, when a curve varies depending on positions of user's eyes, like a windshield of a vehicle, it is difficult to correct a distortion of an image by warping of a single viewpoint.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of playing back an image on a display device, the method including obtaining an input image, obtaining two-dimensional (2D) positions or three-dimensional (3D) positions of both eyes of a user by tracking the eyes using an eye tracker, determining warping transform information corresponding to the 2D positions or the 3D positions of the eyes based on a database (DB) that is provided in advance based on a curvature of an display plane of the display device, warping the input image by applying the warping transform information to the input image, and outputting the warped image.

The warping transform information may include at least one of warping meshes, warping parameter, transform matrix.

The determining of the warping transform information may include extracting grid points adjacent to the 3D positions of the eyes based on the DB, and determining the warping transform information corresponding to the grid points.

The determining of the warping transform information corresponding to the grid points may include determining the warping transform information through a weighted average of respective warping transform information corresponding to the grid points based on a distance between the 3D positions of the eyes and positions of the grid points.

The DB may include warping transform information calculated in advance corresponding to a plurality of voxels that divide a space in the display device.

The determining of the warping transform information may include determining the warping transform information by interpolating warping transform information stored in the DB, corresponding to the eyes.

The determining of the warping transform information may include, based on the DB determining a first warping mesh corresponding to a 3D position of a left eye of the user, and determining a second warping mesh corresponding to a 3D position of a right eye of the user.

The outputting of the warped image may include determining pixel values of a display panel included in the display device from the warped image by performing light field rendering based on the 3D positions of the eyes, and reproducing the determined pixel values on the display panel.

The display plane may include a windshield of a vehicle.

In one general aspect, there is provided a method of playing back an image on a display device, the method including obtaining a stereo image corresponding to both eyes of a user including a left eye and a right eye, obtaining positions of the eyes, determining warping transform information corresponding to the positions of the eyes based on a database (DB) that is provided in advance based on a curvature of an display plane of the display device, warping the stereo image by applying the warping transform information to the stereo image, determining pixel values of a display panel included in the display device from the warped stereo image by performing light field rendering based on the positions of the eyes, and reproducing the determined pixel values on the display panel.

The positions of the eyes may include obtaining a three-dimensional (3D) position of each of the eyes by tracking the eyes using an eye tracker.

The determining of the warping transform information may include extracting grid points adjacent to the positions of the eyes based on the DB, and determining the warping transform information corresponding to the grid points.

The determining of the warping transform information corresponding to the grid points may include determining the warping transform information through a weighted average of respective warping transform information corresponding to the grid points based on a distance between the positions of the eyes and positions of the grid points.

The DB may include warping transform information calculated in advance corresponding to a plurality of voxels that divide a space in the display device.

The determining of the warping transform information may include determining the warping transform information by interpolating warping transform information stored in the DB, corresponding to the eyes.

The determining of the warping transform information may include, based on the DB determining a first warping mesh corresponding to a position of the left eye, and determining a second warping mesh corresponding to a position of the right eye.

A frame rate of the stereo image may be synchronized to a rate of an eye tracking operation, a rate of a stereo rendering operation, a rate of a warping operation, and a rate of a light field rendering operation.

The display plane may include a windshield of a vehicle.

The obtaining of the stereo image may include obtaining a 3D object to be provided to a user, and performing stereo rendering of the 3D object.

In another general aspect, there is provided a display device for playing back an image, the display device including a communication interface configured to obtain a stereo image corresponding to both eyes of a user including a left eye and a right eye, and positions of the eyes, and a processor configured to determine warping transform information corresponding to the positions of the eyes based on a database (DB) that is provided in advance based on a curvature of an display plane of the display device, warp the stereo image by applying the warping transform information to the stereo image, determine pixel values of a display panel included in the display device from the warped stereo image by performing light field rendering based on the positions of the eyes, and reproduce the determined pixel values on the display panel.

The display device may include an eye tracker configured to track three-dimensional (3D) positions of the eyes, wherein the communication interface is configured to obtain the 3D positions of the eyes tracked in the eye tracker.

The processor may be configured to extract grid points adjacent to the positions of the eyes based on the DB and to determine warping transform information corresponding to the grid points.

The processor may be configured to determine the warping transform information through a weighted average of respective warping transform information corresponding to the grid points based on a distance between the positions of the eyes and positions of the grid points.

The DB may include warping transform information calculated in advance corresponding to a plurality of voxels that divide a space in the display device.

The processor may be configured to determine the warping transform information by interpolating warping transform information stored in the DB, corresponding to the eyes.

The display plane may include a windshield of a vehicle.

A frame rate of the stereo image may be synchronized to a rate of an eye tracking operation, a rate of a stereo rendering operation, a rate of a warping operation, and a rate of a light field rendering operation.

The processor may be configured to obtain a 3D object to be provided to a user and to perform stereo rendering of the 3D object, to obtain the stereo image.

In another general aspect, there is provided a method for displaying an image on a device, the method including mapping a position of a display device to a world coordinate system, obtaining three-dimensional (3D) positions of eyes of a user based on the world coordinate system, determining warping meshes corresponding to the 3D positions of the eyes from a database (DB) containing a plurality of meshes corresponding to different positions along a curvature of an display plane of the device, applying the warping meshes to an input image, and outputting the warped image.

The warping meshes comprise grid points and the determining of the warping meshes may include extracting grid points adjacent to the 3D positions of the eyes, and determining the warping meshes corresponding to the grid points.

Other features and aspects will be apparent from the following detailed description, the drawings, and the claims.

Figure 1:
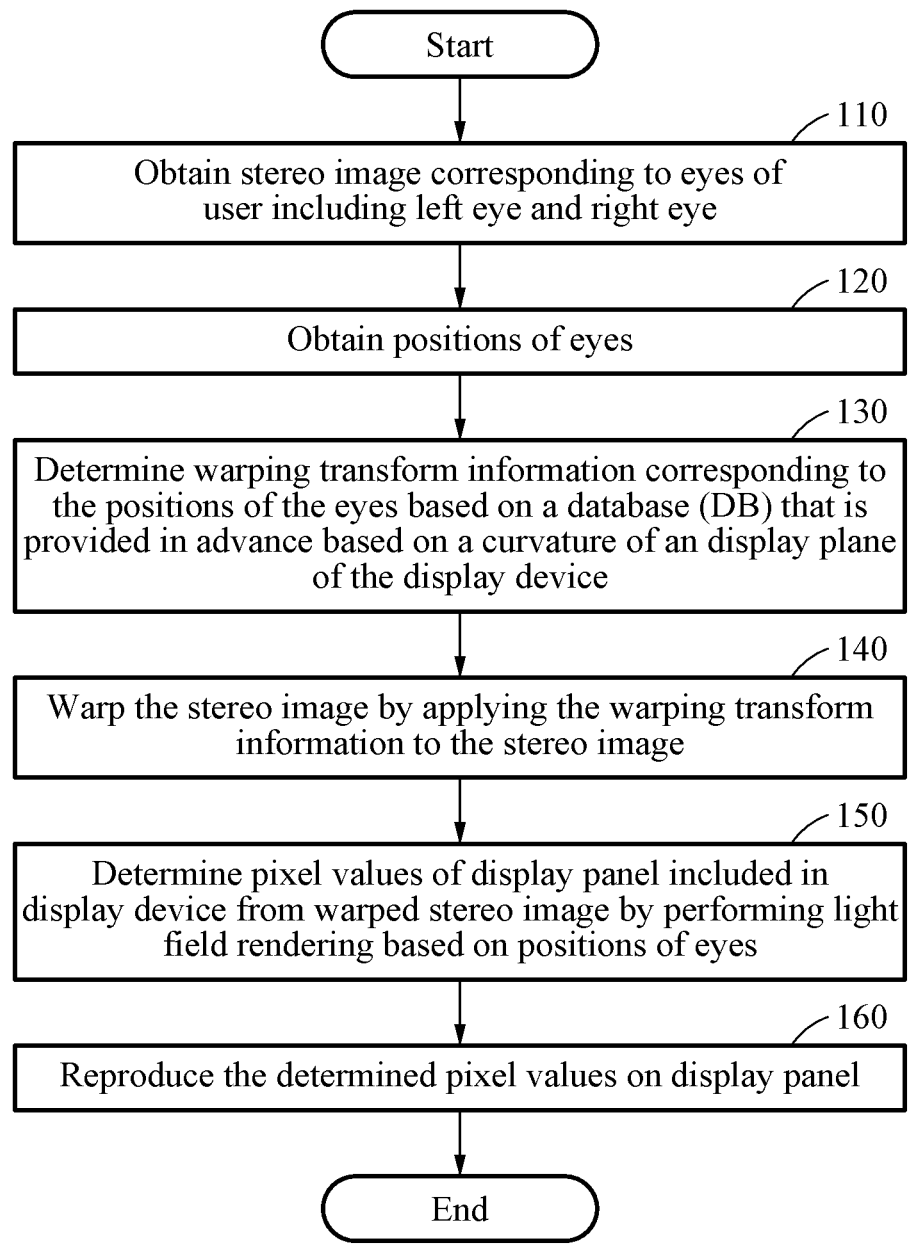
FIG. 1 is a diagram illustrating an example of a method of playing back an image in a display device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the examples is not limited to the descriptions provided in the present specification. Like reference numerals in the drawings denote like elements, and a known function or configuration will be omitted herein.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a diagram illustrating an example of a method of playing back an image in a display device. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

The description for the device for playing back an image is provided with respect to a display. However, the display method and device disclosed below can be used in various other implementations, such as, for example, other vehicular infotainment system, smart phone, mobile devices, wearable smart device (such as, for example, a pair of glasses, glasses-type device, a helmet, a device embedded in the cloths), personal computer (PC), high definition television (HDTV), a personal navigation device or portable navigation device (PND), a game console, global positioning system (GPS) navigation device, digital camera, eye glass display (EGD), and other devices that are operatively connected to a vehicle.

Referring to FIG. 1, in operation 110, the display device obtains a stereo image corresponding to both eyes of a user including a left eye and a right eye. The display device may correspond to a two-dimensional (2D) display device. An example of the display device will be further described below with reference to FIG. 2. For convenience of description, a head-up display (HUD) display will be described below as an example of a display device, however, examples are not limited thereto. For example, various displays or projectors with curvatures may be used. The stereo image includes a left image corresponding to the left eye and a right image corresponding to the right eye. Depending on example, the stereo image may be replaced by a 2D image.

In operation 110, the display device obtains a three-dimensional (3D) object to be output to a user, and performs stereo rendering of the 3D object. The stereo rendering is understood as an operation of generating a left image and a right image based on the 3D object. The 3D object may be, for example, an augmented reality (AR) object or a virtual reality (VR) object. For example, in operation 110, the display device may receive a stereo image that includes a 3D movie that is generated in advance. In this example, a stereo rendering operation may be skipped.

In operation 120, the display device obtains positions of the eyes. The display device may obtain a 2D positions or a 3D position of each of the eyes by tracking the eyes using an eye tracker. An output value of the eye tracker may correspond to relative coordinates based on a point of the display device, for example, a 3D real-number vector value (left_x, left_y, left_z) indicating a position of the left eye of the user and a 3D real-number vector value (right_x right_y, right_z) indicating a position of the right eye of the user. A view-dependent warping may be possible by tracking positions of the eyes of the user using the eye tracker, which will be further described below.

In operation 130, the display device determines warping transform information corresponding to the positions (ex. 2D positions or 3D positions) of the eyes based on a database (DB) that is provided in advance based on a curvature of a display plane included in the display device. A curvature of the display device corresponding to a 2D display device may be represented as a curvature of a display plane included in the 2D display device. Here, the display plane may be understood to include an optical layer, a curved projection screen, and a curved screen in the case when a screen or a wall is placed and an image is projected using a projector behind the screen or the wall, such as in a theater. For example, the display plane may include a windshield of a vehicle. Depending on examples, the display plane may also include a side view mirror, a rear view mirror, or the sun/moon roof mirror of the vehicle. The DB may include warping transform information calculated in advance corresponding to a plurality of voxels that divide a predetermined space (for example, a space in which both eyes of a driver may be disposed in a vehicle) in the display device. For example, an individual voxel may be a polyhedron such as a rectangular parallelepiped. Hereinafter, vertices of a polyhedron are referred to as "grid points".

For example, the DB may include warping transform information calibrated in advance corresponding to a plurality of grid points included in a space that is spaced apart by a distance from an display plane having a preset curvature. Although the expression "warping transform information" is used herein for convenience of description, various terms, for example, warping meshes, a transformation matrix or a warping parameter, indicating a transformation relationship, may be used instead of warping transform information. An example of generating pre-calibrated warping transform information will be further described below with reference to FIG. 5.

In operation 130, the display device extracts grid points adjacent to the positions of the eyes based on the DB. The display device determines warping transform information corresponding to the grid points. For example, when the positions of the eyes are obtained by an eye tracker, the display device may adaptively determine warping transform information by performing a weighted sum or a weighted average of the warping transform information based on a distance between the positions of the eyes and positions of the grid points. The display device may determine a first warping mesh corresponding to the position of the left eye and a second warping mesh corresponding to the position of the right eye.

For example, the display device may determine warping transform information by interpolating key warping meshes stored in the DB, corresponding to both eyes of the user. The display device may obtain key warping meshes corresponding to grid points of a voxel including the position of the left eye from the DB, which will be further described below. The display device may adaptively determine a warping mesh for the left eye by averaging the key warping meshes. Depending on circumstances, the warping mesh for the left eye may be adaptively determined by performing a weighted average of the key warping meshes based on a distance between the position of the left eye and a position of each of the grid points. Similarly, the display device may adaptively determine a warping mesh for the right eye. An example of determining warping transform information in the display device will be further described below with reference to FIG. 6.

In operation 140, the display device warps a stereo image by applying the warping transform information determined in operation 130 to the stereo image. The warping transform information include the first warping mesh for the left eye and the second warping mesh for the right eye. Each of the warping transform information includes information used to transform grids that divide the stereo image. For example, each of the left image and the right image of the stereo image may be divided into grids in a checkerboard pattern. The warping transform information include information used to move vertices of the grids on a two-dimensional (2D) image plane. The first warping mesh for the left eye may be applied to the left image of the stereo image, and the second mesh for the right eye may be applied to the right image of the stereo image. Because the position of the left eye and the position of the right eye are different, the first warping mesh and the second warping mesh are different. Hereinafter, the stereo image to which warping is applied is referred to as the "warped stereo image".

In operation 150, the display device determines pixel values of a display panel included in the display device from the stereo image warped in operation 140, by performing light field rendering based on the positions of the eyes. The light field rendering corresponds to, for example, a process of determining rays propagating to a left eye and a right eye of a user among rays output through a lenticular lens, a parallax barrier or a directional backlight. Through the light field rendering, whether each of pixels in the display panel included in the display device needs to reproduce an image for the left eye or an image for the right eye may be determined. For example, when a pixel is determined to correspond to the left eye, the display device may sample a pixel value in a warped left image. When a pixel is determined to correspond to the right eye, the display device may sample a pixel value in a warped right image.

In operation 160, the display device reproduces the pixel values determined in operation 150 on the display panel. For example, an image reproduced on the display panel may be output using rays with directivity through, for example, a lenticular lens, and the rays may be refracted from the display plane such as a windshield of a vehicle and propagated toward a driver. Different images may be viewed with a left eye and a right eye of the driver, and accordingly the driver may experience a 3D image.

In an example, a frame rate of a stereo image may be synchronized to a rate of an eye tracking operation, a rate of a stereo rendering operation, a rate of a warping operation, and a rate of a light field rendering operation. For example, when the frame rate of the stereo image is 60 frames per second (fps), frames may change every 16.6 milliseconds (ms). In this example, the eye tracking operation, the stereo rendering operation, the warping operation, and the light field rendering operation may be performed within 16.6 ms.

Figure 2:
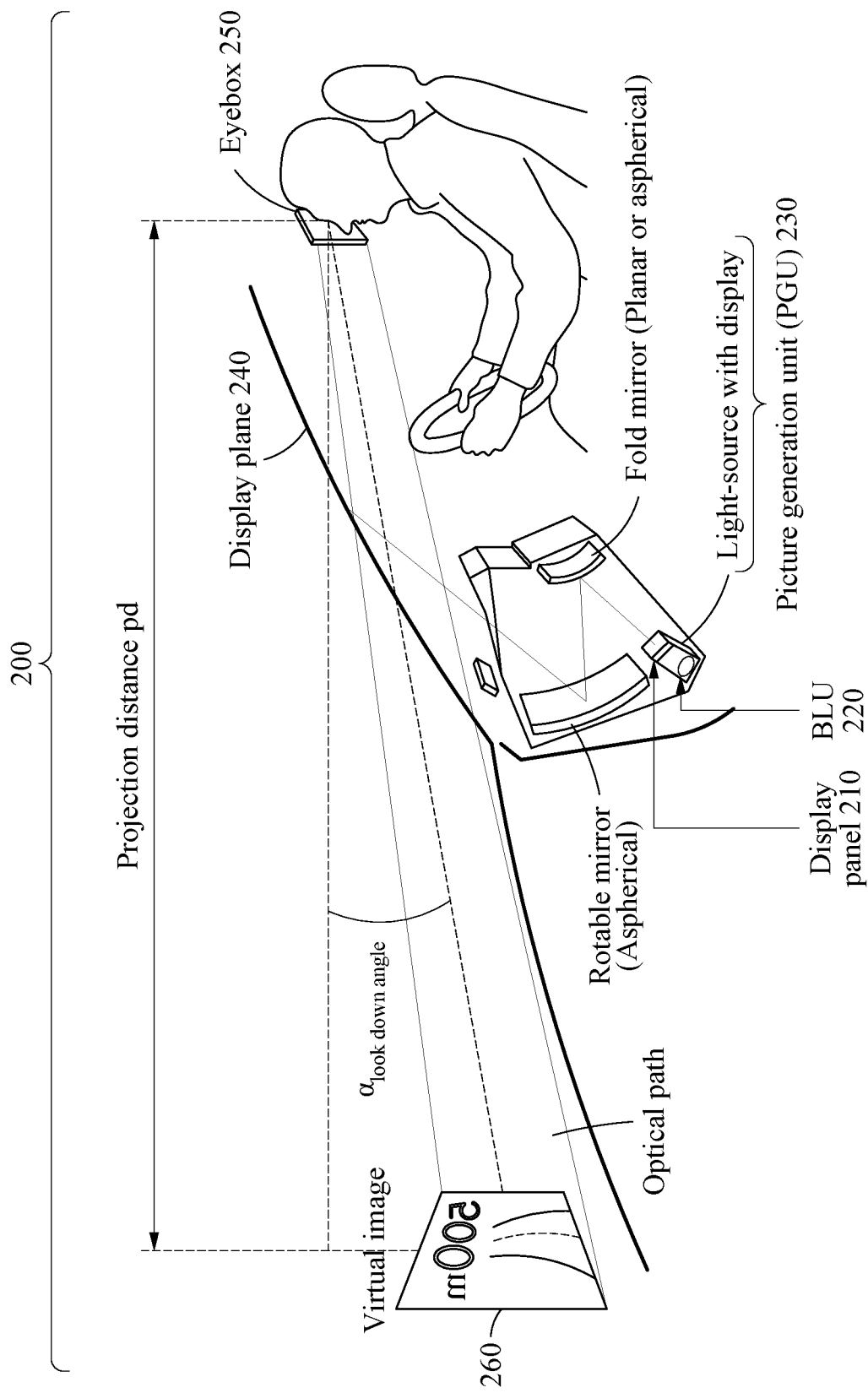
FIG. 2 illustrates an example of a display device.

FIG. 2 illustrates an example of a display device 200. FIG. 2 illustrates a structure of the display device 200. The display device 200 includes a picture generation unit (PGU) 230 including a display panel 210 and a backlight unit (BLU) 220, and a display plane 240. The display device 200 may be, for example, a 3D HUD device.

The display panel 210 includes a plurality of pixels. The BLU 220 uniformly irradiates light to the display panel 210 behind the display panel 210.

To provide a 3D image 260 to a user through the display plane 240, the PGU 230 generates a panel image to be displayed on the display panel 210, based on a movement of a head of the user and positions of eyes of the user in an eyebox 250. For example, a user who is driving may look to the left, the right or the rear while looking at the front, and accordingly a position or an area in which eyes of the user are movable may be limited to be within a predetermined distance. The eyebox 250 may correspond to a position or an area within a predetermined distance at which eyes of a user who is driving are movable.

Although not shown in the drawings, the display device 200 includes an eye tracker, and obtains the positions of the eyes of the user in the eyebox 250 by tracking the eyes of the user. For example, the positions of the eyes of the user may be used by the PGU 230 to perform stereo rendering, warping and/or light field rendering and may be used to determine pixel values of the display panel 210. The PGU 230 may reproduce the determined pixel values on the display panel 210.

In an example, the PGU 230 may include at least one processor. In this example, the display plane 240 may have a preset curvature, and in particular, have a greater curvature at an edge closer to a driver's seat or a passenger seat than at a central portion. Accordingly, a virtual image 260 of the panel image provided through the display plane 240 may also be affected by the curvature, and thus a different distortion may occur depending on the positions of the eyes of the user. Examples of a difference between views generated based on the positions of the eyes of the user will be further described below with reference to FIG. 3.

Figure 3:
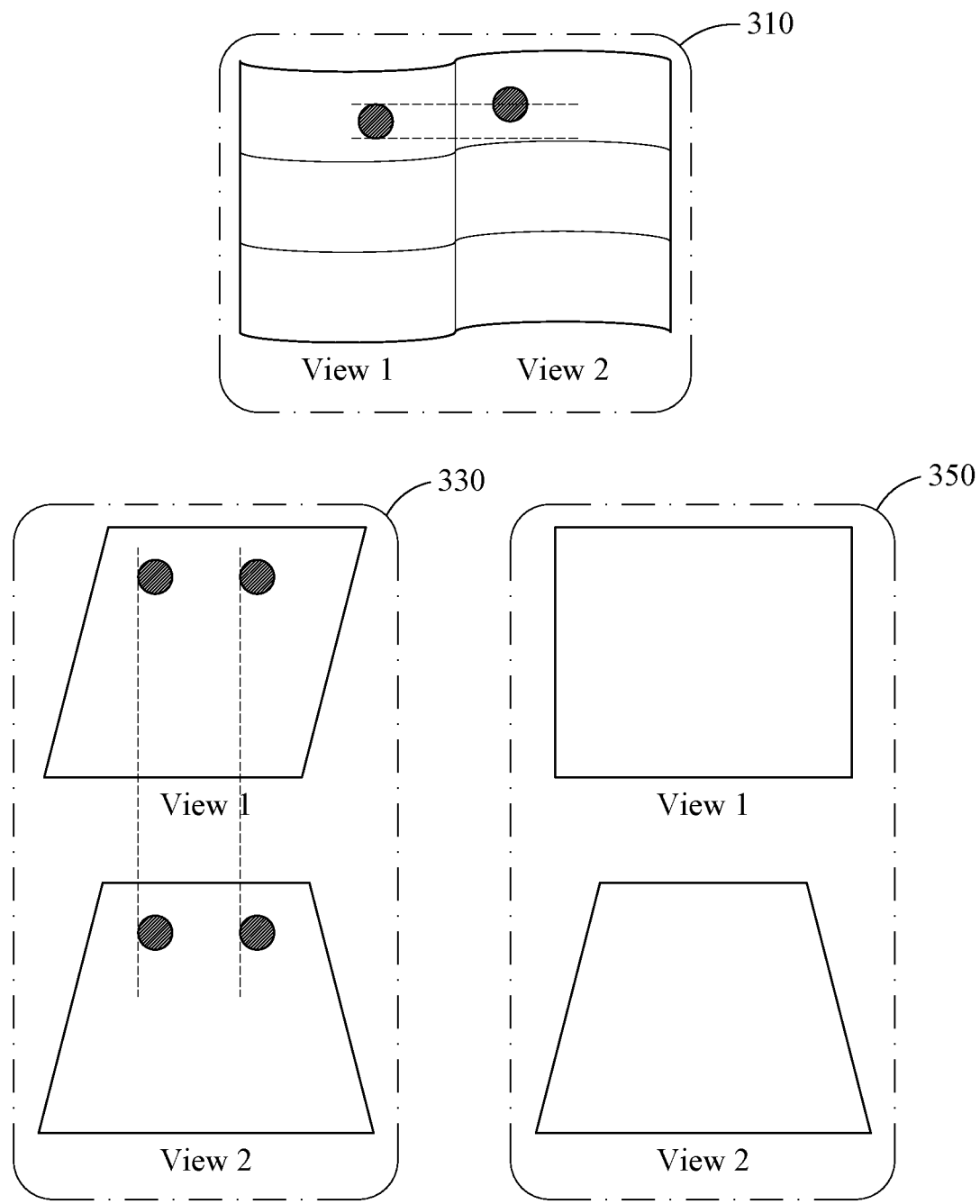
FIG. 3 illustrates examples of a difference between views generated based on positions of both eyes of a user in a display plane with a curvature.

FIG. 3 illustrates examples of a difference between views generated based on positions of both eyes of a user in a display plane with a predetermined curvature. FIG. 3 illustrates example 310 of a difference in position between the views generated based on the positions of the eyes, example 330 of a binocular disparity caused by the positions of the eyes, and example 350 of a difference in an unfolded shape between the views generated based on the positions of the eyes.

As shown in example 310, a position or height of a point viewed in a real space may vary depending on the positions of the eyes even though the same point is viewed in View 1 corresponding to a left eye of the user and View 2 corresponding to a right eye of the user. For example, when the same point looks different, such as View 1 and View 2, as shown in example 310, dizziness may occur.

As shown in example 330, a binocular disparity may change even though View 1 corresponding to the left eye of the user and View 2 corresponding to the right eye of the user appear on the same screen position. In other words, even when a point represents the same position on a screen based on positions of the eyes of the user, the binocular disparity may change as if the point moves forward or backward, which may cause dizziness.

In example 350, a warping parameter or a warping mesh is assumed to match View 1 corresponding to the left eye of the user. When the warping parameter or the warping mesh is equally applied to View 2 corresponding to the right eye of the user, the warping parameter or the warping mesh that matches View 1 may not match View 2, as shown in example 350.

Differences between the views may vary based on the positions of the eyes of the user, as described above, and accordingly warping parameters or warping meshes for the left eye and the right eye may also be distinguished from each other. A stereo image may be warped using different warping meshes based on a position of each of both eyes of a user, and thus it is possible to allow the user to more comfortably look at an image instead of experiencing dizziness.

Figure 4:
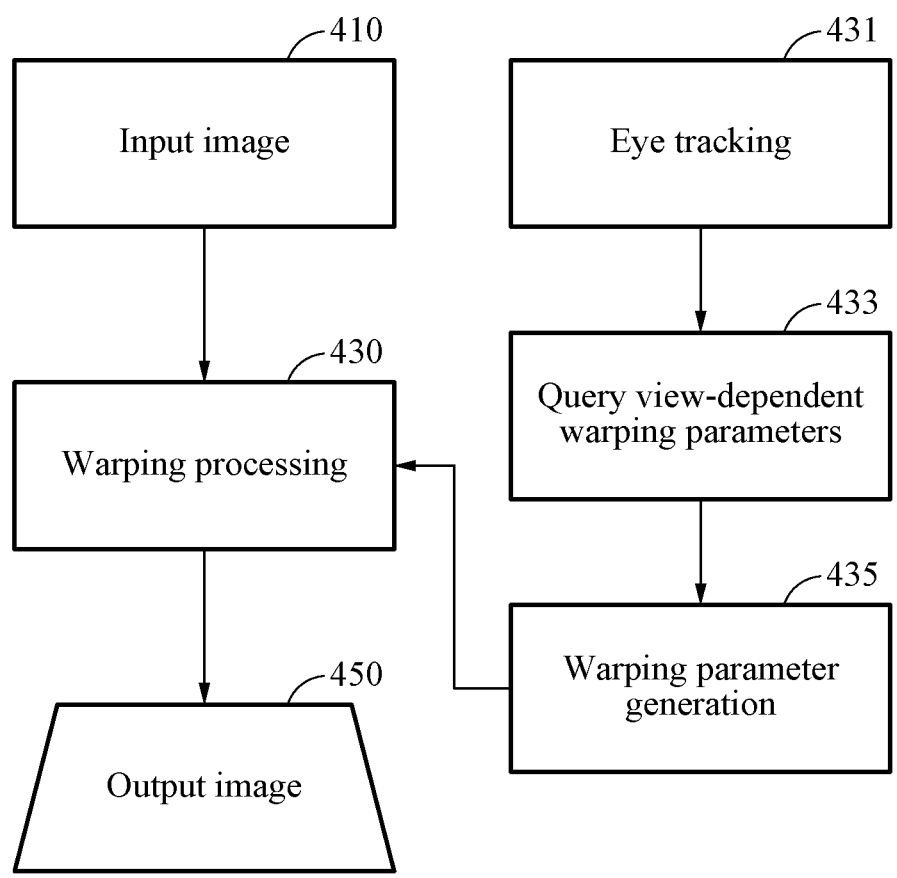
FIGS. 4 and 5 illustrate examples of playing back an image.

FIG. 4 illustrates an example of playing back an image. Referring to FIG. 4, in operation 410, a display device receives an input image. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

The input image may be, for example, a stereo image corresponding to both eyes of a user. Depending on example, the input image may be a single image acquired by capturing both eyes of a user.

In operation 431, the display device tracks positions of both eyes of a user using, for example, an eye tracker or an iris detection sensor. The positions of the eyes may be, for example, 2D positions or 3D positions. In operation 433, the display device queries view-dependent warping parameters by accessing a DB that is provided in advance based on a curvature of a display plane. As described above, the DB stores warping parameters that are calibrated in advance and that depend on views. In operation 435, the display device generates warping transform information corresponding to the positions of the eyes based on the queried warping parameters.

In operation 430, the display device warps the input image by applying the generated warping transform information to the input image received in operation 410. In operation 450, the display device outputs the warped image to a display panel.

Figure 5:
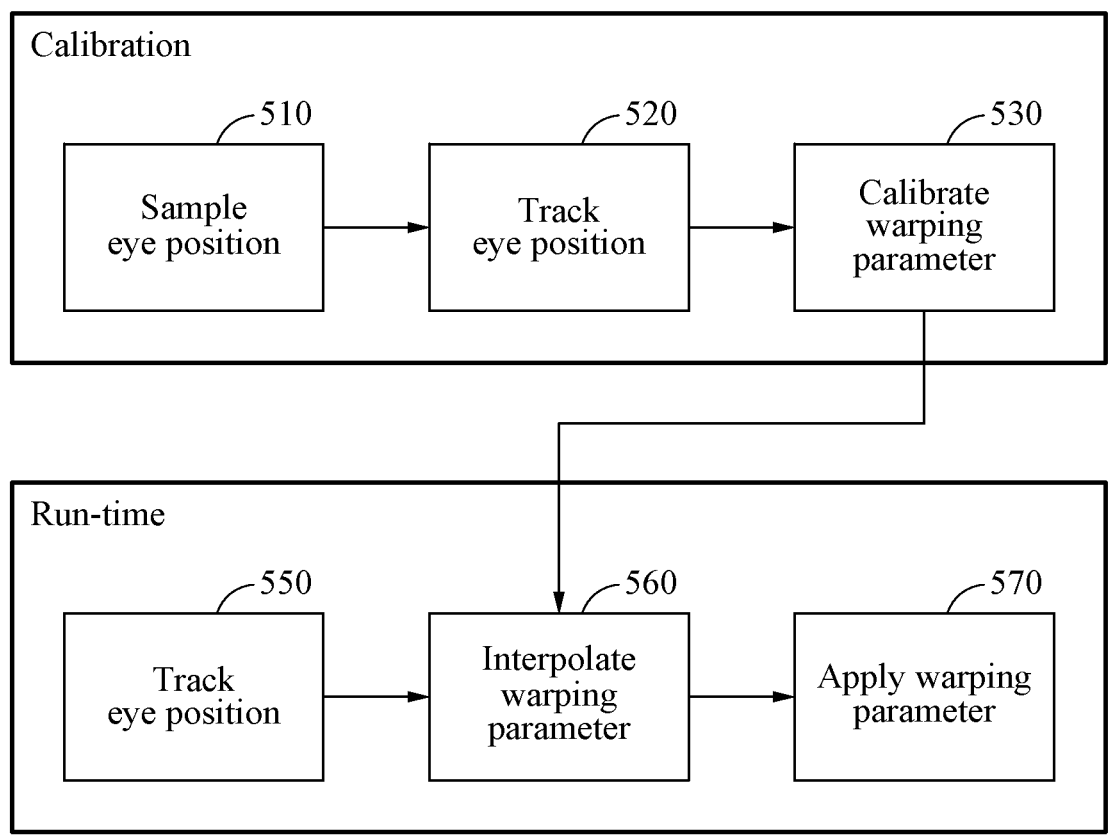

FIG. 5 illustrates another example of playing back an image. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, a display device calculates or measures warping parameters for each of multiple viewpoints that is, both eyes of a user, interpolates the warping parameters to match positions of the eyes of the user in real time based on a result of the calculating or measuring, and uses the interpolated warping parameters in warping.

In an example, the display device may interpolate warping parameters acquired by a pre-calibration process, or warping parameters corresponding to the positions of the eyes of the user tracked in real time using warping meshes, to allow playback of a 3D image so that the user may more comfortably look at the 3D image without dizziness.

In the pre-calibration process, an eye position is sampled in operation 510. For example, an image provided through a display plane of the display device may be captured by a camera in different positions that divide a preset space. A position of the camera corresponds to the eye position.

An eye position is tracked based on the sampled eye position in operation 520, and warping parameters or warping meshes are calculated in advance for each divided point in operation 530. For example, based on a degree to which a captured image is distorted, a warping mesh at a corresponding position may be calibrated. The position of the camera is tracked using an eye tracker of the display device and warping meshes are stored corresponding to the tracked position.

The tracked position is normalized and stored, although not shown in the drawings. For example, in the pre-calibration process, it is difficult to place cameras in different positions at regular intervals. In this example, voxels that divide a 3D viewing candidate space may be determined to have different shapes. In an example, positions stored in the DB may be normalized, to allow the voxels that divide the 3D viewing candidate space to have the same shape. When a position changes in a normalization process, a warping mesh corresponding to the position may also need to change. In the normalization process, the warping mesh may be corrected by an interpolation scheme based on warping meshes of a neighboring position.

In a run-time process, when an actually tracked eye position is input in operation 550, the display device interpolates a warping parameter based on positions of grid points adjacent to the actually tracked eye position in operation 560. For example, the display device may interpolate a warping parameter based on a trilinear interpolation scheme. In operation 570, the display device warps an image by applying the interpolated warping parameter.

Figure 6:
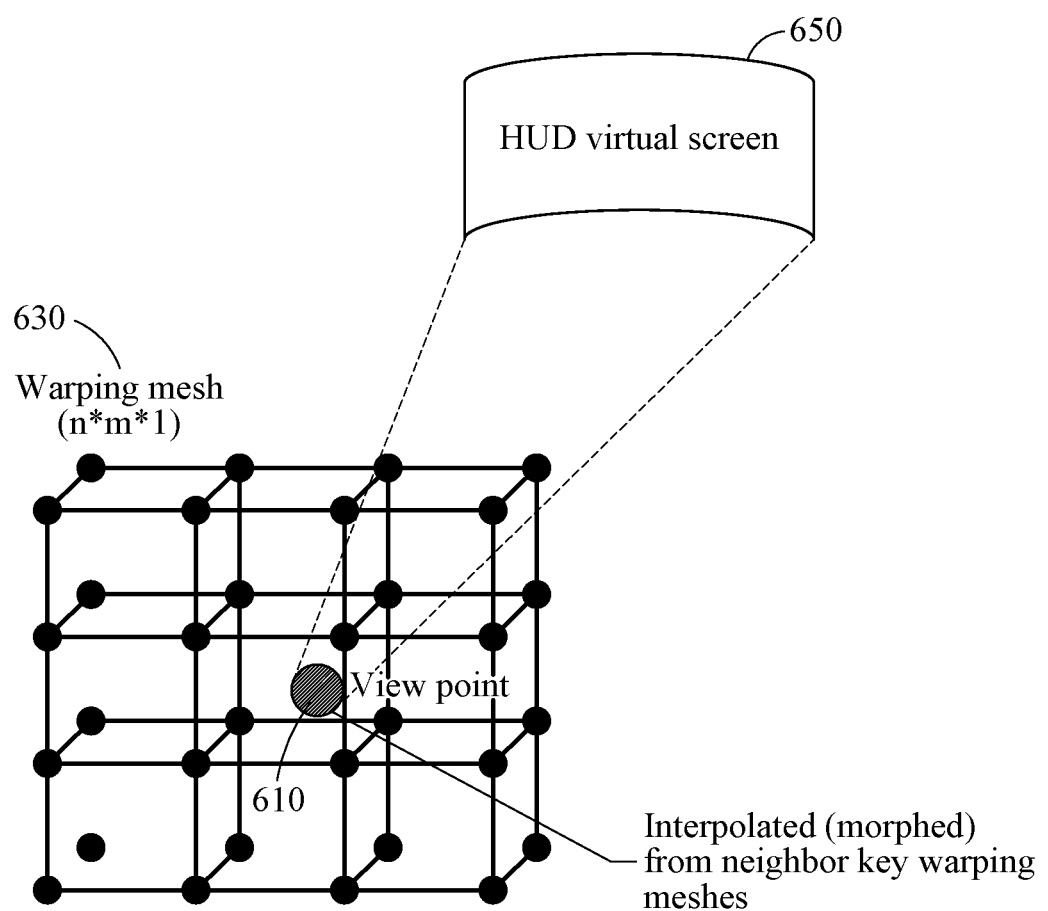
FIG. 6 illustrates an example of determining warping transform information.

FIG. 6 illustrates an example of determining warping transform information. Referring to FIG. 6, a view-dependent warping mesh 630 stored in each node, for example, a grid point, corresponds to a mesh indicating a mapping relationship between a source point (u, v) corresponding to an actual viewpoint 610 and a target point (u', v') of a display virtual screen 650. The source point corresponds to, for example, vertices obtained by dividing an input image into a regular grid of 20×10. Also, the target point corresponds to, for example, vertices corresponding to a shape of a warped input image.

For example, a display device may interpolate target points by a trilinear interpolation scheme of linearly interpolating and approximating data values at any point inside and on sides of a hexahedron including eight grid points or vertices in a 3D space.

Figure 7:
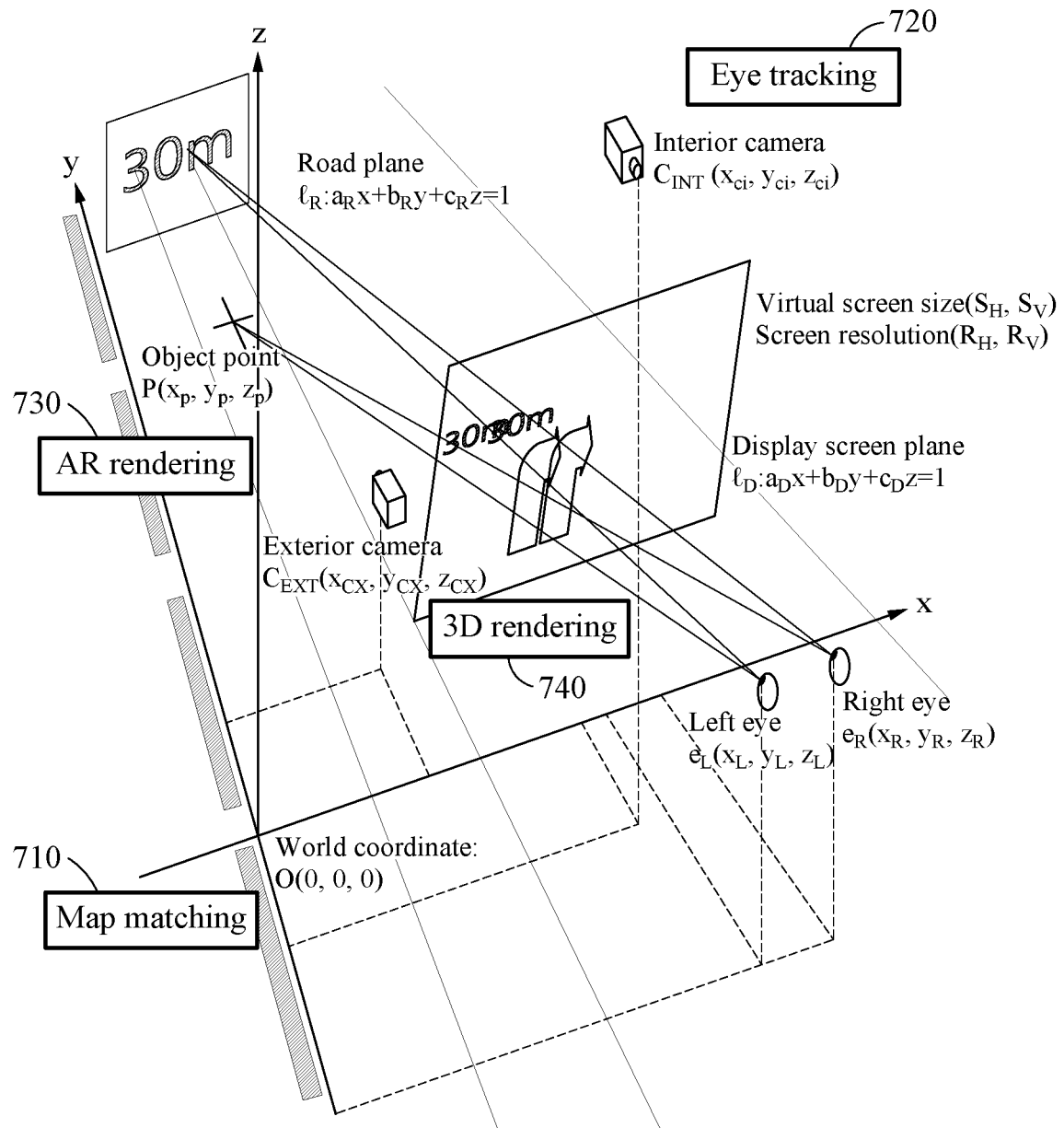
FIG. 7 illustrates an example of reproducing a three-dimensional (3D) object in a display device.

FIG. 7 illustrates an example of reproducing a 3D object in a display device. Referring to FIG. 7, in operation 710, the display device performs map matching to map a position of the display device to a world coordinate system, and performs eye tracking to track a position of each eye of a user in real time using an eye tracker or an interior camera in operation 720.

In operation 730, the display device performs augmented reality (AR) rendering of a 3D object to be displayed on an output image based on positions of the eyes tracked in operation 720. For example, the 3D object may be an AR object.

In operation 740, the display device performs 3D rendering of the rendered 3D object based on the positions of the eyes tracked in operation 720.

Figure 8:
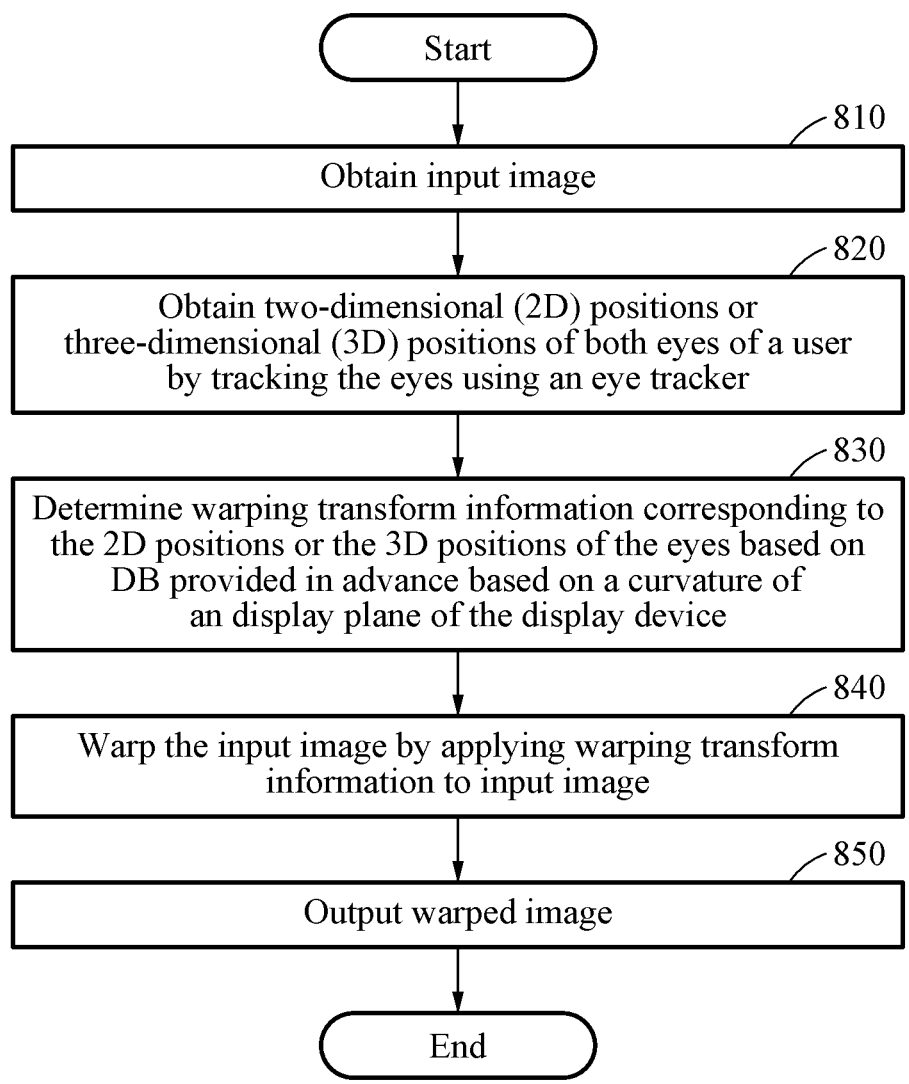
FIG. 8 is a diagram illustrating another example of a method of playing back an image in a display device.

FIG. 8 is a diagram illustrating an example of a method of playing back an image in a display device. Referring to FIG. 8, in operation 810, the display device obtains an input image. The input image may be, for example, a 2D image including both eyes of a user.

In operation 820, the display device obtains 3D positions of eyes of a user by tracking the eyes using an eye tracker.

In operation 830, the display device determines warping transform information corresponding to the 3D positions of the eyes based on a DB that is provided in advance based on a curvature of a display plane included in the display device. The display plane may include, for example, a windshield of a vehicle. For example, in operation 830, the display device may extract grid points adjacent to positions of the eyes based on the DB. In this example, the DB may include warping transform information calculated in advance corresponding to a plurality of voxels that divide a preset space in the display device. Also, the display device may determine warping transform information corresponding to grid points. For example, the display device may determine warping transform information through a weighted average based on a distance between the positions of the eyes and positions of the grid points. In addition, the display device may interpolate warping transform information that are stored in the DB, corresponding to the eyes, to determine warping transform information. The display device may determine a first warping mesh corresponding to a position of a left eye, based on the DB. Also, the display device may determine a second warping mesh corresponding to a position of a right eye, based on the DB.

In operation 840, the display device warps the input image by applying the warping transform information to the input image. In operation 850, the display device outputs the warped image. For example, in operation 850, the display device may perform light field rendering based on the positions of the eyes to determine pixel values of a display panel included in the display device from the warped image and to reproduce the determined pixel values on the display panel.

Figure 9:
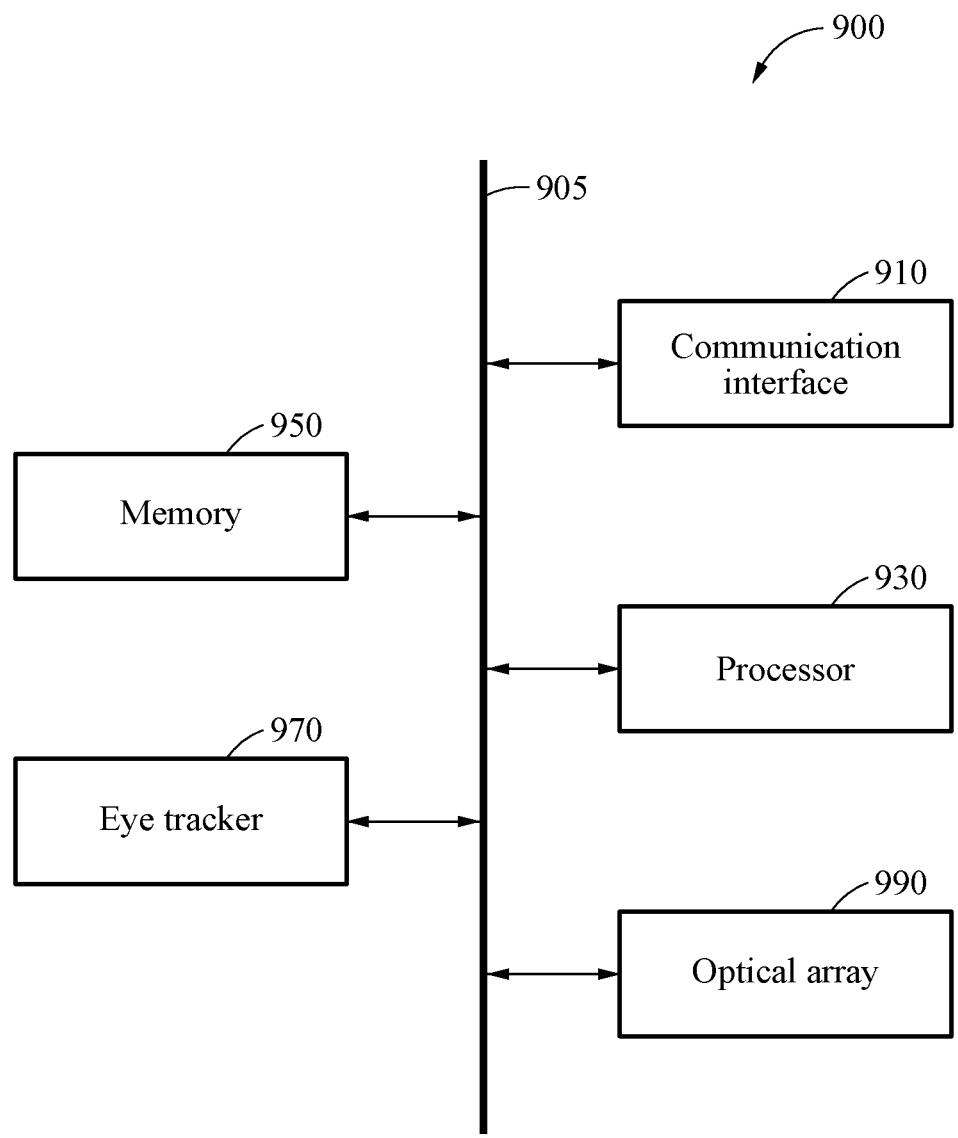
FIG. 9 is a diagram illustrating an example of a display device.

FIG. 9 illustrates an example of a display device 900. Referring to FIG. 9, the display device 900 includes a communication interface 910 and a processor 930. The display device 900 further includes a memory 950, an eye tracker 970 and an optical array 990. The communication interface 910, the processor 930, the memory 950, the eye tracker 970 and the optical array 990 are connected to each other via a communication bus 905.

The communication interface 910 receives a stereo image corresponding to both eyes of a user including a left eye and a right eye, and positions of the eyes. For example, the communication interface 910 may receive a 3D position of each of the eyes tracked by the eye tracker 970.

The processor 930 determines warping transform information corresponding to the positions of the eyes based on a DB that is provided in advance based on a curvature of the optical array 990 in the display device 900. The processor 930 warps the stereo image by applying the warping transform information to the stereo image. The processor 930 performs light field rendering based on the positions of the eyes, to determine pixel values of a display panel included in the display device 900 from the warped stereo image. The processor 930 reproduces the determined pixel values on the display panel.

The memory 950 stores the stereo image corresponding to the eyes of the user obtained through the communication interface 910 and/or the positions of the eyes obtained through the eye tracker 970.

The memory 950 stores a DB that is provided in advance based on a curvature of a display plane included in the display device 900. The memory 950 stores the pixel values determined by the processor 930.

The eye tracker 970 tracks a 3D position of each of the eyes.

The optical array 990 displays an image played back by the pixel values determined by the processor 930 to the user.

Depending on examples, the communication interface 910 may output the stereo image warped by the processor 930, or may provide the warped stereo image to another apparatus. The communication interface 910 may also output the pixel values determined by the processor 930.

The processor 930 performs at least one of the methods described above with reference to FIGS. 1 through 8 or an algorithm corresponding to at least one of the methods. The processor 930 may be a hardware-implemented data processing device having a circuit that is physically structured to execute desired operations. For example, the desired operations may include code or instructions included in a program. The processor 930 includes, for example, a central processing unit (CPU), a processor core, a multi-core processor, a reconfigurable processor, a multicore processor, a multiprocessor, an application-specific integrated circuit (ASIC), and a field programmable gate array (FPGA), and/or a graphics processing unit (GPU), or any other type of multi- or single-processor configuration. Further details regarding the processor 930 is provided below.

The processor 930 executes a program and controls the display device 900. Codes of the program executed by the processor 930 are stored in the memory 950.

The memory 950 stores a variety of information generated in a processing process of the above-described processor 930. Also, the memory 950 stores a variety of data and programs. The memory 950 may include, for example, a volatile memory or a non-volatile memory. The memory 950 includes a large-capacity storage medium such as a hard disk to store a variety of data. Further details regarding the memory 950 is provided below.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of playing back an image on a head-up display (HUD) device. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of playing back an image on a display device, the method comprising:
   obtaining an input image;
   obtaining two-dimensional (2D) positions or three-dimensional (3D) positions of both eyes of a user by tracking the eyes using a sensor;
   determining warping transform information corresponding to the 2D positions or the 3D positions of the eyes based on a database (DB) that is provided in advance based on a curvature of a display plane of the display device;
   warping the input image by applying the warping transform information to the input image; and
   outputting the warped image,
   wherein the determining of the warping transform information comprises:
   extracting grid points adjacent to the 2D or 3D positions of the eyes based on the DB;
   obtaining first key warping meshes corresponding to grid points of a voxel including a position of a left eye of the user from the DB;
   adaptively determining a first warping mesh for the left eye by applying a weighted average to the first key warping meshes, the weighted average being obtained by averaging weights that increase in response to a decrease in a distance between the position of the left eye and a position of each of grid points adjacent to the position of the left eye;
   obtaining second key warping meshes corresponding to grid points of a voxel including a position of a right eye of the user from the DB; and adaptively determining a second warping mesh for the right eye by applying a weighted average to the second key warping meshes, the weighted average being obtained by averaging weights that increase in response to a decrease in a distance between the position of the right eye and a position of each of grid points adjacent to the position of the right eye, wherein the first key warping meshes and the second key warping meshes comprise a view-dependent parameter indicating a mapping relationship between a source point corresponding to a real view point of an input image and a target point corresponding to a shape in which the input image is warped on a virtual screen of a HUD system.

2. The method of claim 1, wherein the warping transform information further comprises a warping parameter or a transform matrix.

3. The method of claim 1, wherein the DB comprises warping transform information calculated in advance corresponding to a plurality of voxels that divide a space in the display device.

4. The method of claim 1, wherein the determining of the warping transform information comprises determining the warping transform information by interpolating warping transform information stored in the DB, corresponding to the eyes.

5. The method of claim 1, wherein the outputting of the warped image comprises:
determining pixel values of a display panel included in the DISPLAY device from the warped image by performing light field rendering based on the 3D positions of the eyes; and
reproducing the determined pixel values on the display panel.

6. The method of claim 1, wherein the display plane comprises a windshield of a vehicle.

7. A method of playing back an image on a display device, the method comprising:
obtaining a stereo image corresponding to both eyes of a user including a left eye and a right eye;
obtaining positions of the eyes;
determining warping transform information corresponding to the positions of the eyes based on a database (DB) that is provided in advance based on a curvature of a display plane of the display device,
warping the stereo image by applying the warping transform information to the stereo image;
determining pixel values of a display panel included in the display device from the warped stereo image by performing light field rendering based on the positions of the eyes; and
reproducing the determined pixel values on the display panel,
wherein the determining of the warping transform information comprises:
extracting grid points adjacent to the 2D or 3D positions of the eyes based on the DB;
obtaining first key warping meshes corresponding to grid points of a voxel including a position of a left eye of the user from the DB;
adaptively determining a first warping mesh for the left eye by applying a weighted average to the first key warping meshes, the weighted average being obtained by averaging weights that increase in response to a decrease in a distance between the position of the left eye and a position of each of grid points adjacent to the position of the left eye;

obtaining second key warping meshes corresponding to grid points of a voxel including a position of a right eye of the user from the DB; and adaptively determining a second warping mesh for the right eye by applying a weighted average to the second key warping meshes, the weighted average being obtained by averaging weights that increase in response to a decrease in a distance between the position of the right eye and a position of each of grid points adjacent to the position of the right eye, wherein the first key warping meshes and the second key warping meshes comprise a view-dependent parameter indicating a mapping relationship between a source point corresponding to a real view point of an input image and a target point corresponding to a shape in which the input image is warped on a virtual screen of a HUD system.

8. The method of claim 7, wherein the obtaining of the positions of the eyes comprises obtaining a three-dimensional (3D) position of each of the eyes by tracking the eyes using a sensor.

9. The method of claim 7, wherein the DB comprises warping transform information calculated in advance corresponding to a plurality of voxels that divide a space in the display device.

10. The method of claim 7, wherein the determining of the warping transform information comprises determining the warping transform information by interpolating warping transform information stored in the DB, corresponding to the eyes.

11. The method of claim 7, wherein a frame rate of the stereo image is synchronized to a rate of an eye tracking operation, a rate of a stereo rendering operation, a rate of a warping operation, and a rate of a light field rendering operation.

12. The method of claim 7, wherein the display plane comprises a windshield of a vehicle.

13. The method of claim 7, wherein the obtaining of the stereo image comprises:
obtaining a 3D object to be provided to a user; and
performing stereo rendering of the 3D object.

14. A non-transitory computer-readable storage medium storing instructions that, when executed by a processor, cause the processor to perform the method of claim 1.

15. A display device for playing back an image, the display device comprising:
a communication processor configured to obtain a stereo image corresponding to both eyes of a user including a left eye and a right eye, and positions of the eyes; and
a processor configured to:
determine warping transform information corresponding to the positions of the eyes based on a database (DB) that is provided in advance based on a curvature of a display plane of the display device, wherein the determining of the warping transform information comprises determining a first warping mesh corresponding to a position of the left eye, and determining a second warping mesh corresponding to a position of the right eye;
warp the stereo image by applying the warping transform information to the stereo image;
determine pixel values of a display panel included in the display device from the warped stereo image by performing light field rendering based on the positions of the eyes; and
reproduce the determined pixel values on the display panel, wherein to determine the warping transform information, the processor is further configured to:
- extract grid points adjacent to the 2D or 3D positions of the eyes based on the DB;
- obtain first key warping meshes corresponding to grid points of a voxel including a position of a left eye of the user from the DB;
- adaptively determine a first warping mesh for the left eye by applying a weighted average to the first key warping meshes, the weighted average being obtained by averaging weights that increase in response to a decrease in a distance between the position of the left eye and a position of each of grid points adjacent to the position of the left eye;
- obtain second key warping meshes corresponding to grid points of a voxel including a position of a right eye of the user from the DB; and
- adaptively determine a second warping mesh for the right eye by applying a weighted average to the second key warping meshes, the weighted average being obtained by averaging weights that increase in response to a decrease in a distance between the position of the right eye and a position of each of grid points adjacent to the position of the right eye,
- wherein the first key warping meshes and the second key warping meshes comprise a view-dependent parameter indicating a mapping relationship between a source point corresponding to a real view point of an input image and a target point corresponding to a shape in which the input image is warped on a virtual screen of a HUD system.

16. The display device of claim 15, further comprising:
a sensor configured to track three-dimensional (3D) positions of the eyes,
wherein the communication processor is configured to obtain the 3D positions of the eyes tracked by the sensor.

17. The display device of claim 15, wherein the DB comprises warping transform information calculated in advance corresponding to a plurality of voxels that divide a space in the display device.

18. The display device of claim 15, wherein the processor is further configured to determine the warping transform information by interpolating warping transform information stored in the DB, corresponding to the eyes.

19. The display device of claim 15, wherein the display plane comprises a windshield of a vehicle.

20. The display device of claim 15, wherein a frame rate of the stereo image is synchronized to a rate of an eye tracking operation, a rate of a stereo rendering operation, a rate of a warping operation, and a rate of a light field rendering operation.

21. The display device of claim 15, wherein the processor is further configured to obtain a 3D object to be provided to a user and to perform stereo rendering of the 3D object, to obtain the stereo image.

22. A method for displaying an image on a device, the method comprising:
- mapping a position of a display device to a world coordinate system;
- obtaining three-dimensional (3D) positions of eyes of a user based on the world coordinate system;
- determining warping meshes corresponding to the 3D positions of the eyes from a database (DB) containing a plurality of meshes corresponding to different positions along a curvature of a display plane of the device;
- applying the warping meshes to an input image; and
- outputting the warped image,
wherein the determining of the warping meshes comprises:
- extracting grid points adjacent to the 2D or 3D positions of the eyes based on the DB;
- obtaining first key warping meshes corresponding to grid points of a voxel including a position of a left eye of the user from the DB;
- adaptively determining a first warping mesh for the left eye by applying a weighted average to the first key warping meshes, the weighted average being obtained by averaging weights that increase in response to a decrease in a distance between the position of the left eye and a position of each of grid points adjacent to the position of the left eye;
- obtaining second key warping meshes corresponding to grid points of a voxel including a position of a right eye of the user from the DB; and
- adaptively determining a second warping mesh for the right eye by applying a weighted average to the second key warping meshes, the weighted average being obtained by averaging weights that increase in response to a decrease in a distance between the position of the right eye and a position of each of grid points adjacent to the position of the right eye,
wherein the first key warping meshes and the second key warping meshes comprise a view-dependent parameter indicating a mapping relationship between a source point corresponding to a real view point of an input image and a target point corresponding to a shape in which the input image is warped on a virtual screen of a HUD system.

* * * * *